UNITED STATES PATENT OFFICE.

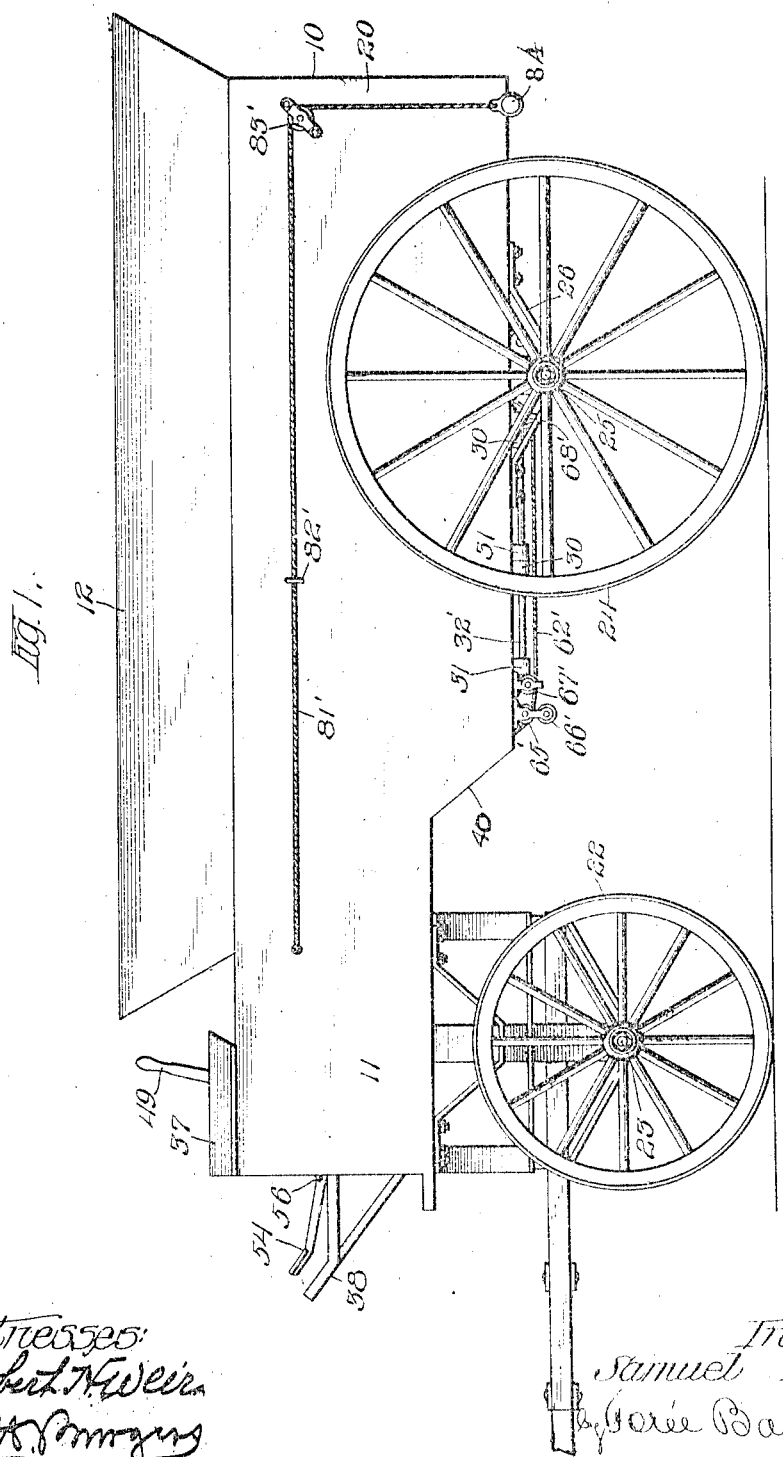

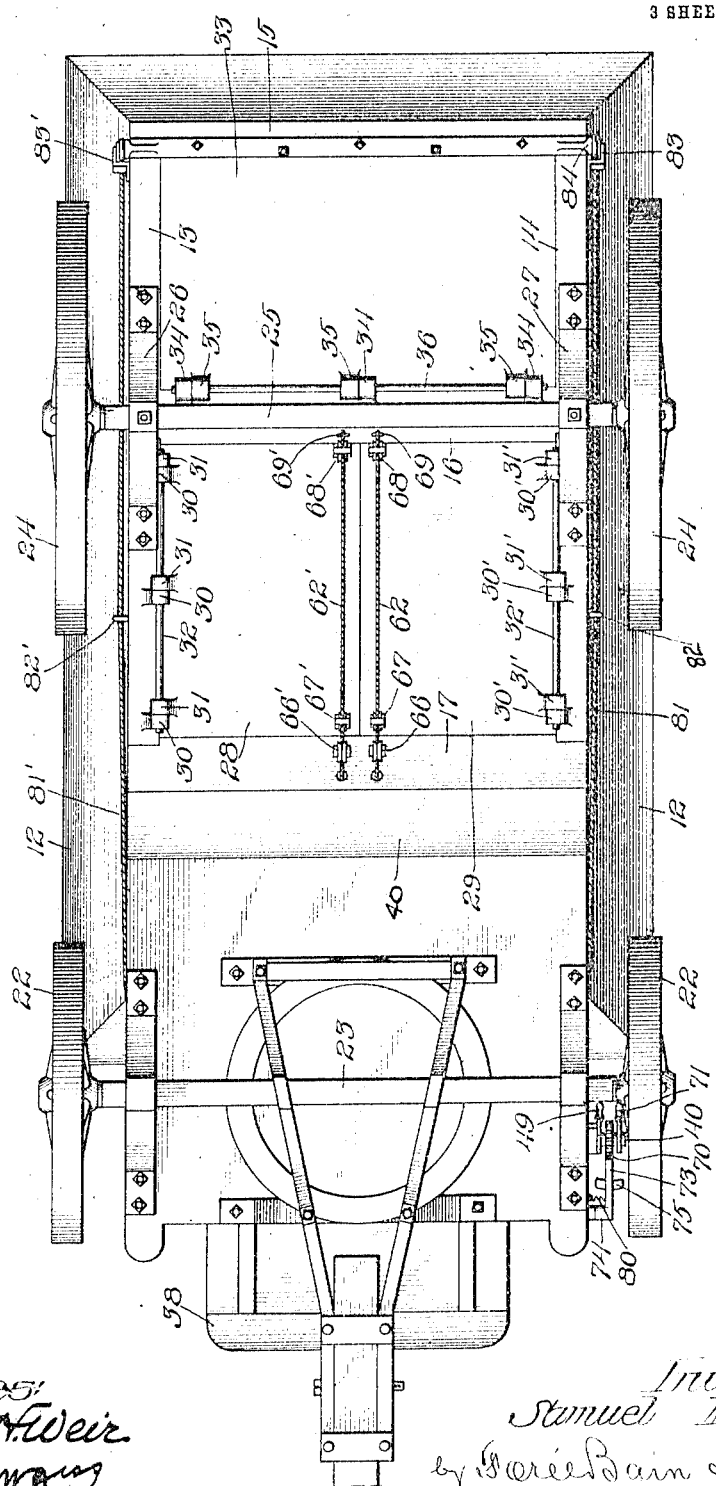

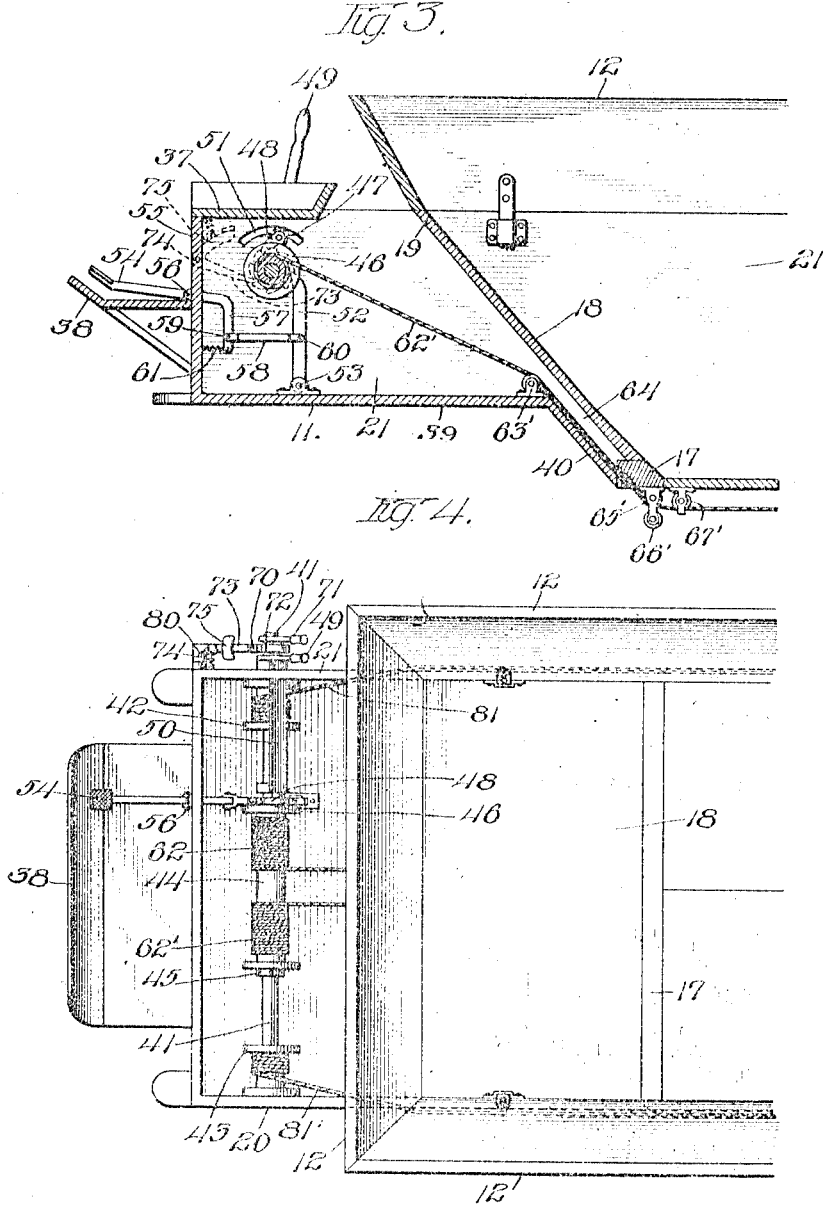

SAMUEL MILLER, OF CHICAGO, ILLINOIS.

DUMP-WAGON.

1,040,725.  Specification of Letters Patent.  Patented Oct. 8, 1912.

Application filed February 24, 1912. Serial No. 679,643.

*To all whom it may concern:*

Be it known that I, SAMUEL MILLER, a citizen of the United States, residing at Chicago, in the county of Cook and State of Illinois, have invented certain new and useful Improvements in Dump-Wagons, of which the following is a specification.

My invention relates to improvements in dump wagons.

One of the salient objects of my invention is to provide a dump wagon which will dump that portion of its load contained in the bed, in front of the hind wheels, in a central windrow, so as not to be in the path of the said wheels of the wagon when it is moved forward.

Another object of my invention is to provide a wagon bed of such character that the entire contents or portions thereof may be dumped when the doors, located in the bottom wall or floor of the bed, are opened.

Other and further objects of my invention will become readily understood by persons skilled in the art upon consideration of the following description taken in conjunction with the drawings, wherein:—

Figure 1 is a side elevation of my wagon; Fig. 2 is a view of the bottom thereof; Fig. 3 is a longitudinal section of the front end of the wagon bed; and Fig. 4 is a top plan view thereof.

In all the views the same reference characters are used to indicate similar parts.

In the exemplification illustrated 10 indicates the bed, 11 the raised seat extension, and 12 the removable side wings. The bottom frame of the bed consists of side members 13 and 14, and transverse connecting sills 15, 16, and 17. The front end wall 18, of the bed, extends forwardly at an angle from the sill 17 to a point 19, near the seat of the driver. The side walls 20 and 21, preferably, extend in vertical planes upwardly from the floor of the bed, and the removable wings 12 may be flared so as to increase the capacity of the bed above the upward limits of the sides 20 and 21. It will be observed that the seat extension 11 is raised above the main bed to provide room for the front wheels and appurtenant parts 22, said wheels 22 being supported on the front axle 23 under the seat extension 11. Rear wheels 24 are supported on the rear axle 25, and the axle lies immediately under the sill 16 and is supported upon the side members 13 and 14 by the brackets 26 and 27 respectively.

Located in the floor of the bed are the doors 28 and 29 which are hinged to the side members 13 and 14 respectively by means of hinge members 30—31 and 30'—31' respectively, of which they may be any required number. For purposes of convenience of construction I preferably secure the hinge members 30 and 31, pivotally together by means of a single pintle rod 32, a similar rod 32' being provided for the other set of said hinge members, as clearly shown in Fig. 2. The doors 28 and 29 open downwardly and being located in front of the rear axle 25, they dump or deposit the load in a continuous windrow so that when the content of the bed is deposited upon the ground, immediately under the bed, it is so fashioned, by the angle of the doors as to be entirely out of the path of the trailing wheels 24, when the wagon moves forward over the said deposit. This is of importance and considerable value, as it requires great effort of the horses to move the wagon after the dirt, or other content, of the wagon has been deposited on the ground if the doors open in such way as to leave the deposit in the path of the rear wheels. A door 33, which also opens downwardly, is hinged to the transverse sill 16, by hinge members 34 and 35 secured in pivotal alinement by a pintle rod 36. These doors are operable separately and, of course, a partition may be made through the bed immediately over the sill 16, so that the content of the bed at the rear of such partition would be independently controlled by the door 33 and a similar partition may be erected in the bed immediately over the adjoining edge surfaces of the doors 28 and 29, so that these doors may separately control independent bins or portions of the bed space.

Erected upon the upper portion of the seat extension 11, is the driver seat 37, below and in front of which is the foot board 38. The floor wall of the seat extension 11 extends forwardly above the floor proper and at its rear edge adjoins a wall 40 which is substantially parallel with end wall 18 of the bed leaving a space therebetween for the cables, or chains, connected to the doors 28 and 29.

Located below the seat 37 and transversely of the seat extension, is a winch composed of a shaft 41, properly journaled in the sides 20 and 21 and adapted to be freely rotated in the said bearings. Firmly secured to each end of the shaft are drums 42 and 43; these drums turn with the shaft and are adapted to contain a cable or chain, for communication with and operation of the door 33. Near the mid portion of the shaft, 41, is a drum 44, which may be freely revolved upon the shaft 41 independently thereof, collar 45 preventing lateral movement of the drum along the shaft. A ratchet wheel 46 is secured to a drum 44, and an arm 47, carrying a pawl 48, is journaled on the shaft 41. A hand operated arm 49 is similarly journaled on the shaft 41, on the outside of the seat extension. This arm 49, is connected to the arm 47, by means of a bar 50. The bar 50 passes through a slot 51 in the side member 21 of the bed. It is now clearly apparent that when the hand lever 49 is oscillated the lever 47, carrying the pawl 48, is similarly oscillated and the drum 44 is thereby rotated.

In order that each reciprocation of the lever 49 may be effective a retaining pawl 52, for engagement with the ratchet wheel 46, is pivoted to the floor 35, as at 53. The release lever 54, is pivoted to the vertical wall 55 of the seat extension as at 56, and is downturned on the interior of the seat extension as at 57. A link 58 connects the pawl 52, and the downturned portion 57 of the foot lever 54, as at 59 and 60, and a spring 61 yieldingly holds the pawl with its upper free end in engagement with the teeth of the ratchet wheel 46. Now it is apparent that when the lever 49 is oscillated and the drum 44 is rotated to the extent of one tooth of the wheel 46 by an oscillation of lever 49 the retaining pawl 52 will engage the teeth of the wheel 46 and hold the drum 44 in the position in which it is placed by the oscillation of the lever 49. The lever 49 may then be returned and the operation repeated. Where it is desired to release the drum 44 from the pawl 52, pressure may be applied to the fore end of the foot lever 54, thereby pushing pawl 52 out of engagement with the teeth of the ratchet wheel 46. Two chains or ropes 62 and 62' are wound upon the drum 44. The rope 62 and the rope 62' are arranged in similar manner with the respective doors, and I will therefore indicate the various parts connected with ropes 62' with the same reference characters with the addition of the exponent prime ('). The rope 62 extends from the drum 44 over the pulley 63, located on the floor 39; through the space 64 between the walls 18 and 40 between pulleys 65 and 66, which are secured to the sill 17; and then under the pulleys 67 and 68, which are mounted upon opposite ends of the door 29; the terminal of the rope being secured to the sill 16, as at 69. Now it is manifest that when the rope 62 is free to move from the drum 44, the door 29 will be lowered by its own weight and the chain or rope 62 will run freely over the pulleys referred to without being opposed by any great amount of friction. After the doors have been swung open it is evident that upon the rotation of the drum 44 to wind up the ropes, cable or chains the doors 28 and 29 may be raised simultaneously to their uppermost closed positions, and when so moved may be retained by locking the drum 44 through the instrumentality of the pawl 52, in a manner heretofore described.

Secured to the shaft 41 is a ratchet wheel 70 which in every respect is similar to the ratchet wheel 46. The hand lever 71 is capable of oscillation upon the shaft 41 in a manner similar to hand lever 49, and it carries a pawl 72, by means of which the ratchet wheel 76 may be rotated to the extent of a tooth at each stroke, or reciprocation, of the lever 71.

A retaining pawl 73, is pivoted as at 74 and is upturned as at 75 to provide a foot lever. A spring 80 serves to yieldingly retain the pawl is association with the teeth of the ratchet wheel 70 so that when the shaft 41 is rotated by means of the oscillatable lever 71, it is retained in the position that it has been thus placed by the reciprocation of the lever 71, in a manner similar to the operation of the lever 49 as heretofore described. The ropes or chains 81 and 81' may be wound upon the respective drums 42 and 43. Chains 81 and 81' are similarly connected to the door 33, like parts being indicated on the drawing by the same numerals distinguished by the exponent prime ('). The chain 81 passes through the interior of seat extension 11, through the side wall 21, along the outside of the side wall 21, through a staple 82, over a pulley 83, and at its end is secured to a projection 84, located at the extreme end of the door 33. Now it is manifest that when the chains or ropes 81 and 81' are slack the door 33 will fall or open downwardly of its own weight and the weight of the load and that when it has opened to its fullest extent it may be again closed by means of the operation of the lever 71, conveniently located at the right hand side of the driver. The door is raised by the means described equally from each of its free ends without warping or twisting and the application of the power to lift the door is uniform and efficient.

While I have referred to the connecting mediums between the doors and the means for lifting them as ropes, it is evident that wire cable or chains may be employed for this purpose, or any other flexible connecting medium of the desired strength and durability.

While I have herein described a single embodiment of my invention for the purposes of complete disclosure, it is evident that many changes may be made therein without departing from the spirit of my invention and within the scope of the appended claims.

What I claim is:

1. A wagon having a bottom frame including side members and a transverse sill above the rear axle, a door for closing the bottom in rear of said sill having free corners at the rear corners of the wagon and doors for closing the bottom in front thereof, having free contacting edges along the longitudinal center of the wagon, cables associated with the doors behind and in front of said sill respectively at said free corners and free edges thereof, a transverse shaft on the wagon, inner and outer drums on the shaft respectively fixed and loose with respect thereto, the respective inner and outer cables engaging said drums, and independent means to rotate either drum.

2. The combination of a wagon having a bottom frame formed of side members and transverse sills, one at the front edge of the wagon and one over the axle thereof, the bottom having therefore two completely unobstructed spaces separated by the transverse sill above the axle of the wagon, a transversally hinged door closing the rear space, operating means therefor, two doors closing the other unobstructed space, each hinged to a side member and contacting with the other at the longitudinal center of the wagon, two independent cable-attaching means upon each transverse sill, pulleys near the free corners of the doors which close the front space in the bottom frame, the pulleys and appropriate sill-carried cable-engaging means lying in longitudinal alinement to form for each door an independent cable-engaging means, a cable associated with said means for each door, and means for operating said two cables independently of the means for operating the door which closes said rear space in the bottom frame.

3. A wagon having a bottom including side members and a transverse sill, a door hinged to the sill to close the bottom in rear thereof, two doors closing the bottom each hinged to a side member and contacting with the other door at the longitudinal center of the wagon, a transverse shaft on the wagon, a central drum and outer drums, a cable extending from each outer drum along the side of the wagon to a point of connection to the free corner of the transversely hinged door, a cable extending from each end of the central drum under the free edge of the respective longitudinally hinged door to a point of connection to said sill, one set of drums being fixed to said shaft and one loose thereon, and independent means to operate said loose and fixed drums for independent control of the doors in rear and in front of said sill.

In testimony whereof I hereunto set my hand in the presence of two witnesses.

SAMUEL MILLER.

In the presence of—
 FORÉE BAIN,
 MARY F. ALLEN.